(No Model.)

H. BARBER.
DRAFT SPRING.

No. 510,669. Patented Dec. 12, 1893.

Witnesses
Inventor
Hiram Barber

UNITED STATES PATENT OFFICE.

HIRAM BARBER, OF CHICAGO, ILLINOIS.

DRAFT-SPRING.

SPECIFICATION forming part of Letters Patent No. 510,669, dated December 12, 1893.

Application filed April 14, 1891. Serial No. 388,891. (No model.)

*To all whom it may concern:*

Be it known that I, HIRAM BARBER, a citizen of the United States, residing at Chicago, in the county of Cook and State of Illinois, have invented a certain new and useful Improvement in Spring Draft Attachments for Wagons and other Vehicles, which is fully set forth in the following specification, reference being had to the accompanying drawings, in which—

Figure 1:
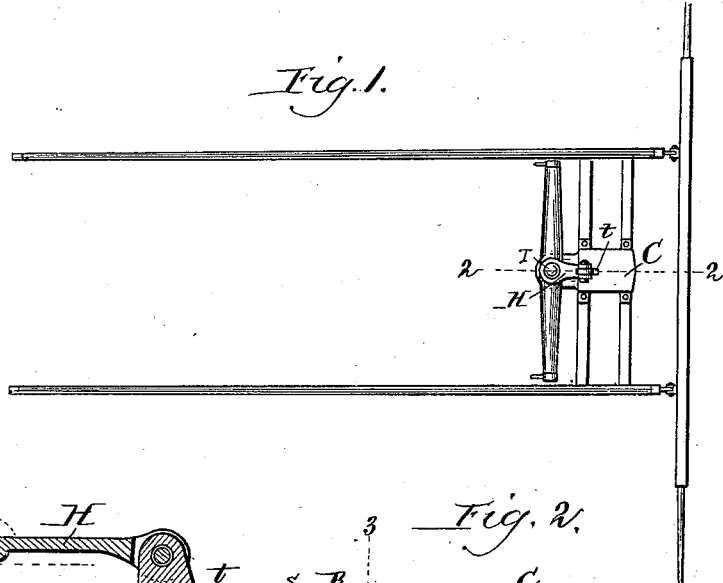
Figure 2:
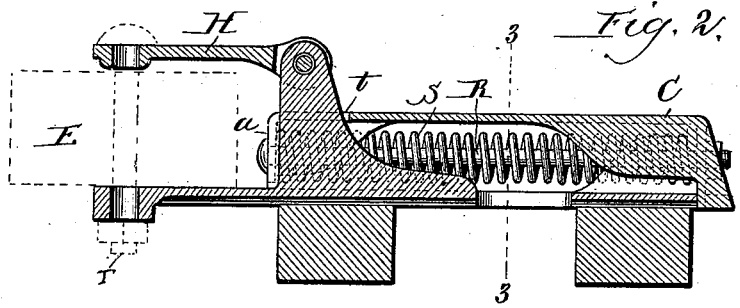
Figure 3:
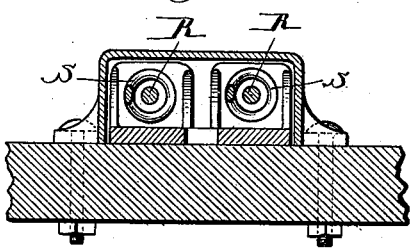
Figure 4:
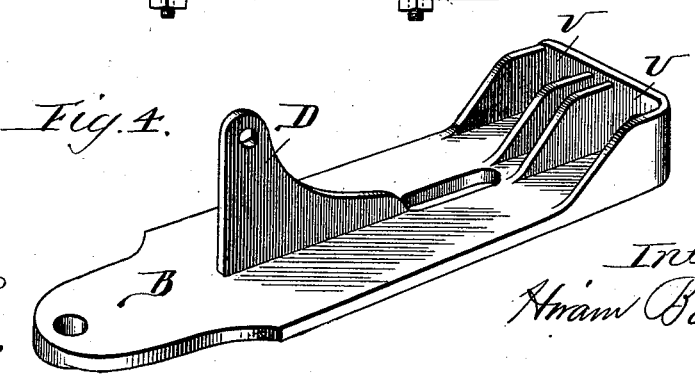

Figure 1, is a plan view of my spring draft attachment showing the same in position when attached to the shafts of a single wagon. Fig. 2, is a sectional view of my spring draft attachment on the dotted line 2—2. Fig. 3, is a view in cross section of my spring draft attachment on the dotted line 3—3. Fig. 4, is a view in perspective of the draw bar or plate B in my spring draft attachment.

The object of my spring draft attachment is to secure a yielding connection between the draft animal and the fixed point of contact with the vehicle. The relief to the draft animal from the concussion upon the shoulder to which it is subjected where the hitch is unyielding, which I am to secure by this device, is now generally recognized as of great advantage, both in conserving the energies of the animal and in reducing the wear and tear of the vehicle and harness to the minimum. Many valuable devices have hitherto been perfected for this purpose, all of them, more especially designed, however, for use upon double wagons. In my spring draft attachment herein described I have sought to perfect one for use on single wagons also.

In constructing the same I make use of two coil springs which I inclose in the frame or casing C, where they are held in place by the two rods R. R. extending longitudinally through the casing C and placed parallel with each other. The draw bar or plate B is placed within the frame or casing C immediately below the springs S. S. with the rear ends of said springs resting in the corresponding chambers U. U., the rear walls of which chambers are perforated for the passage of the rear ends of the rods R. R. The draw bar or plate B is provided in front with the standard D. which projects upward between the springs S. S. and through the slot *t* in the upper forward part of the top of the frame or casing C; the hammer strap H is attached to the upper portion of the standard D. The whiffletree E is held in place by the bolt T between the forward ends of the hammer strap H and the draw bar or plate B. When therefore forward pressure is applied to the whiffle-tree E the end walls of the recesses U. U. are moved forward upon the rods R. R. against the rear ends of the springs S. S. which are at the same time compressed against the interior surface of the front plate or wall *a* of the casing C and thus is furnished a yielding connection between the wagon and the draft animal.

Having thus fully explained the object, construction, and operation of my spring draft attachment, what I claim as novel and as being matter of my invention for which I seek Letters Patent is the following:

1. In a draft equalizer, the longitudinally movable bottom or draw plate, having at its rear end chambers to receive the ends of spiral springs, an integral central vertical standard near its front end having a transverse perforation at its top, a vertical perforation at its front, and perforations through the rear walls of its chambers, in combination with a longitudinal casing adapted to fit over and inclose the movable bottom plate and firmly secured or bolted to fixed parts of the shafts or vehicles, said exterior casing being provided with a slot or opening in its upper side through which the vertical standard of the movable plate projects; horizontal rods one end of which projects through the perforation in the rear walls of the movable bottom plate, the opposite end through the perforation in the front end of the fixed casing; retaining nuts on opposite ends of said rods, and spiral springs surrounding said rods and confined between the movable draw plate and fixed casing substantially as and for the purpose described.

2. In a draft equalizer, the chambered movable draw-plate provided with the perforated vertical central standard, the fixed exterior casing inclosing same provided with the slot in its upper side to receive the vertical standard of the movable plate, the horizontal rods fitted with retaining nuts or heads on their ends and projecting through perforations in the rear walls of the chambers of the movable plate and of the front wall of the fixed exterior casing, the spiral springs surrounding the horizontal rods and confined within the chambered plate by the fixed casing and a hammer strap pivoted to the upper end of the vertical standard in the movable draw plate, all combined and arranged substantially as and for the purpose described.

Dated Chicago, April 7, 1891.

HIRAM BARBER.

In presence of—
ALICE E. HALL,
CHARLES S. GRAVES.